US012754048B2

(12) United States Patent
(10) Patent No.: US 12,754,048 B2

Sowada

(45) Date of Patent: Oct. 6, 2026

(54) FLOW SWITCH WITH VARIABLE ORIFICE

(71) Applicant: Barksdale, Inc., Los Angeles, CA (US)

(72) Inventor: Michael Sowada, Nidda (DE)

(73) Assignee: Barksdale, Inc., Los Angeles, CA (US)

( * ) Notice: Subject to any disclaimer, the term of this patent is extended or adjusted under 35 U.S.C. 154(b) by 313 days.

(21) Appl. No.: 18/425,548

(22) Filed: Jan. 29, 2024

(65) Prior Publication Data

US 2025/0244153 A1 Jul. 31, 2025

(51) Int. Cl.
*G01F 1/36* (2006.01)

(52) U.S. Cl.
CPC .................................... *G01F 1/36* (2013.01)

(58) Field of Classification Search
CPC . G01F 1/28; G01F 15/14; G01F 1/662; G01F 1/667; G01F 15/18; G01F 25/10; G01F 1/24; G01F 23/0007; G01F 23/02; G01F 1/26; G01F 1/36; G01F 1/72; G01F 23/56; G01F 1/56; G01F 1/684; G01F 15/00; G01F 1/00; G01F 1/075; G01F 1/34; G01F 1/66; G01F 1/80; G01F 1/20; G01F 1/206; G01F 1/3218; G01F 1/383; G01F 1/40; G01F 1/44; G01F 1/663; G01F 1/6986; G01F 1/74; G01F 1/82; G01F 15/06; G01F 15/063; G01F 15/185; G01F 1/05; G01F 1/06; G01F 1/12; G01F 1/69; G01F 1/6965; G01F 1/699; G01F 11/04; G01F 11/28; G01F 13/006; G01F 15/125; G01F 23/292; G01F 23/70; G01F 23/74; G01F 25/00; G01F 25/0092; G01F 25/11; G01F 5/00

See application file for complete search history.

(56) References Cited

U.S. PATENT DOCUMENTS

| | | | | |
|---|---|---|---|---|
| 4,605,039 A | | 8/1986 | Johnson et al. | |
| 5,174,330 A | | 12/1992 | Golestan et al. | |
| 5,261,597 A | * | 11/1993 | Perlman | G05D 23/1333 236/93 R |
| 7,559,485 B2 | * | 7/2009 | Monson | G05D 23/022 236/103 |
| 8,281,669 B2 | * | 10/2012 | Ertl | G01F 1/363 73/861.52 |
| 2018/0347312 A1 | | 12/2018 | Green et al. | |

FOREIGN PATENT DOCUMENTS

| | | | | |
|---|---|---|---|---|
| CH | 657702 A5 | * | 9/1986 | G01F 1/383 |
| DE | 202024101016 U1 | * | 3/2024 | H01H 35/247 |
| JP | 6639876 B2 | | 2/2020 | |
| WO | WO-2020210651 A1 | * | 10/2020 | A61M 5/141 |

* cited by examiner

*Primary Examiner* — Andre J Allen

(74) *Attorney, Agent, or Firm* — Standley Law Group LLP; Adam J. Smith; Bryan P. Finneran

(57) ABSTRACT

A flow switch includes a base body, an orifice body which is moveable relative to the base body, and a spring connected to the orifice body. The orifice body has an opening that is variable in size with movement of the orifice body. In exemplary embodiments, a projection, such as a rod, is fixed relative to the base body and the spring is configured such that, at a first volumetric flow rate at least a distal end of the projection extends through the opening, and at a second volumetric flow rate which is higher than the first volumetric flow rate, the projection is located wholly outside of the orifice body.

19 Claims, 5 Drawing Sheets

FLOW SWITCH WITH VARIABLE ORIFICE

CROSS-REFERENCE TO RELATED APPLICATIONS

This application is filed as original and therefore makes no priority claim.

TECHNICAL FIELD

Exemplary embodiments relate generally to flow switches, such as with a variable orifice opening for reducing pressure drop, as well as systems and methods related to the same.

BACKGROUND AND SUMMARY OF THE INVENTION

Flow switches are known which are generally used to monitor volumetric flow. These switches generally emit an electrical signal when the volumetric flow exceeds a predetermined ceiling threshold and/or drops below a predetermined floor threshold (e.g., falls out a predetermined, acceptable range). The pressure drop across an orifice of these flow switches, however, generally increases exponentially as the flow rate increases. In certain applications, such as where the operating range of the volumetric flow is significantly higher than the switching point, the flow switch is generally unsuitable due to the relatively high pressure drop. An example of such applications includes, but is not necessarily limited to, emergency shutdown of a pump before running dry. Increasing the orifice opening may reduce pressure drop but may also result in a pressure drop which is too low in the lower portion of the operating range, which may result in unreliability of the flow switch. What is needed is a flow switch that is operable over relatively large volumetric flow rate ranges.

A flow switch that is reliably operable over relatively large volumetric flow rate ranges is provided. The flow switch may include a variable orifice opening, such as in an orifice body. In exemplary embodiments, without limitation, the flow switch is configured to provide a relatively smaller orifice at relatively lower volumetric flow rates, such as to allow relatively precise switching, and configured to provide a relatively larger orifice at relatively higher volumetric flow rates, such as to minimize pressure drop. A projection, such as a rod, may be provided in exemplary embodiments which may be selectively extended within or outside of the orifice opening. For example, without limitation, at relatively higher volumetric flow rates the orifice body may be compressed against a spring which may result in the projection being spaced apart from the opening in the orifice body, resulting in a larger orifice and lower pressure drop. At relatively lower volumetric flow rates, the orifice body may be advanced by the spring such that the opening extends over at least a portion of the projection, resulting in a smaller orifice body for more precise switching. Preferably, the end of the projection is tapered to avoid abrupt changes in the size of the orifice and associated oscillation.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
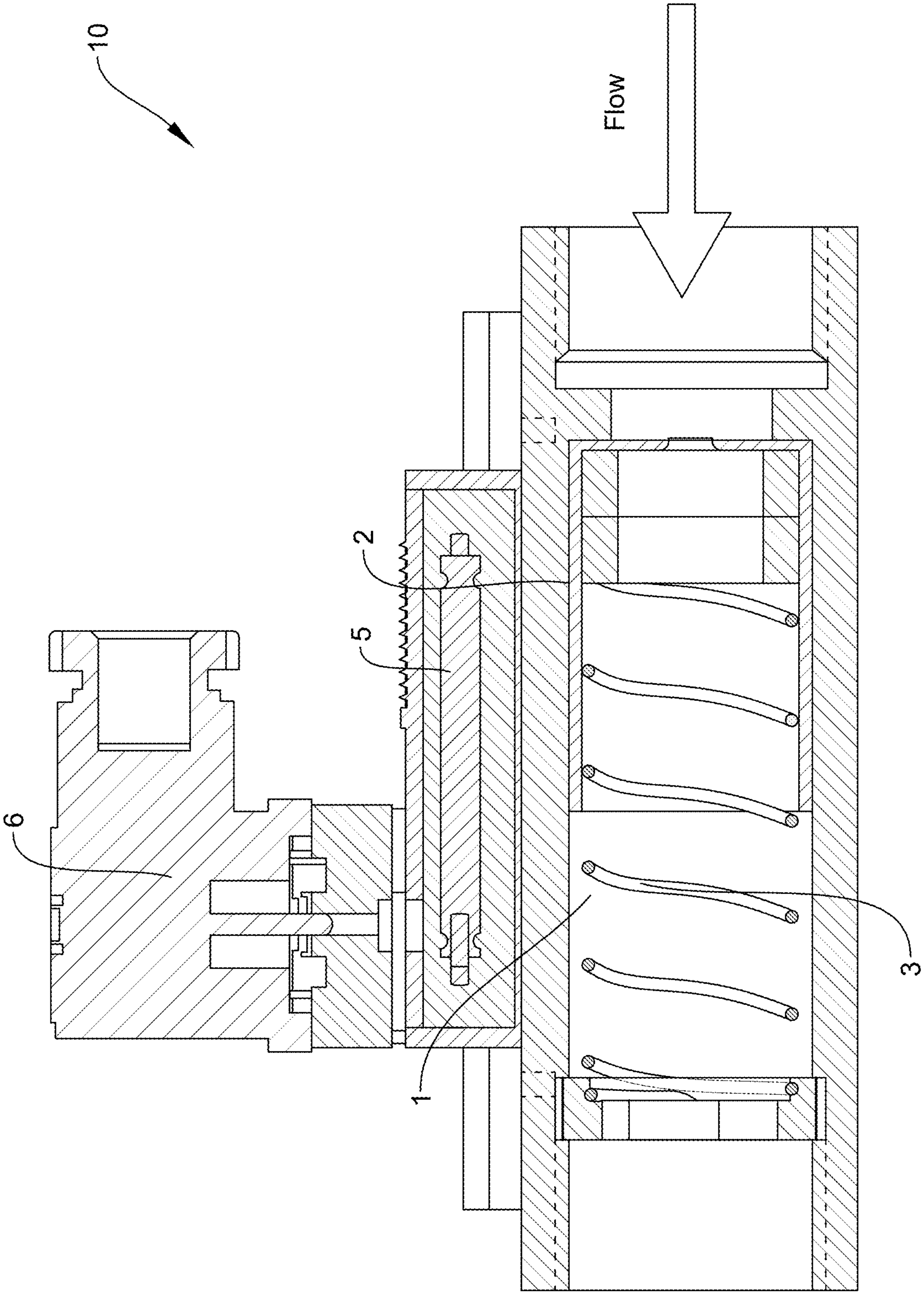
FIG. 1 Prior Art
FIG. 1 is a side sectional view of a prior art flow switch.

FIG. 1 illustrates a prior art flow switch 10. As a flow of fluid travels through or otherwise contacts the flow switch 10, the flow may travel through or contact an orifice body 2 of a base body 1. The fluid may be any type or kind of fluid (e.g., oil, water, air, etc.). The orifice body 2 may be moved against a spring 3 by the flow. The spring 3 may be biased against the intended direction of the flow. Where the volumetric flow rate encountered is sufficient, the orifice body 2 is displaced sufficiently to cause a switch 5 to be closed. In exemplary embodiments, a magnet is connected to, or forms part of, the orifice body 2 such that sufficient movement of the orifice body 2 resulting in closing or opening of the switch 5, which may comprise a reed which may optionally be biased in one position (e.g., opened or closed). Electrical signals reporting the status of the switch 5 (e.g., opened or closed) may be provided by way of electrical wires and/or transducers at an electronics subassembly 6. Other known techniques for switching and/or otherwise providing signaling may be utilized.

Figure 2A:
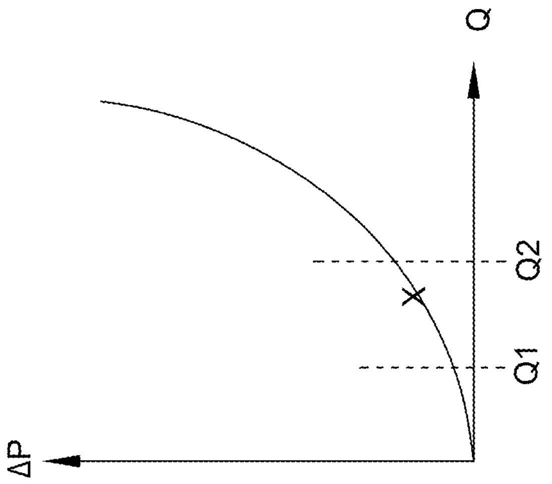
FIG. 2A is an idealized graphical representation of exemplary pressure drop vs flow rate chart for exemplary operations of the flow switch of FIG. 1.
Figure 2B:
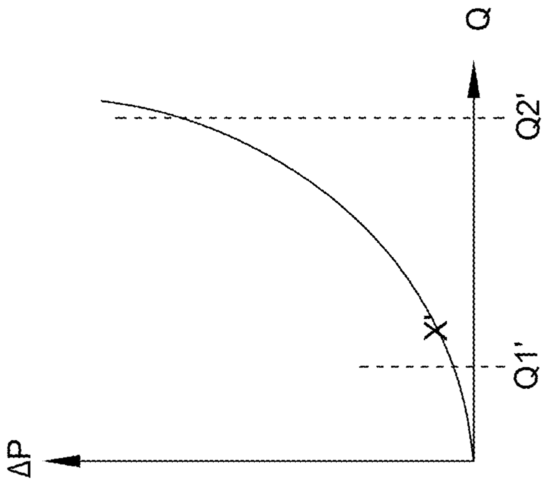
FIG. 2B is an idealized graphical representation of exemplary pressure drop vs flow rate chart for other exemplary operations of the flow switch of FIG. 1.

The pressure drop across the orifice body 2 generally increases exponentially as the flow rate increases. As demonstrated in FIG. 2A, by way of example without limitation, where the switching point X is in the middle or upper portion of the operating range (Q1-Q2) for the switch 10, the pressure drop is generally not problematic. As demonstrated in FIG. 2B, by way of example without limitation, where the anticipated operating range (Q1'-Q2') of the flow is significantly (e.g., at least 150% of, at least 3 times of, or the like) higher than the switching point X', the flow switch 10 may be unsuitable due to the relatively high pressure drop at such relatively high volumetric flows. Examples of such applications may include, without limitation, emergency shutdown of a pump before running dry.

Figure 3:
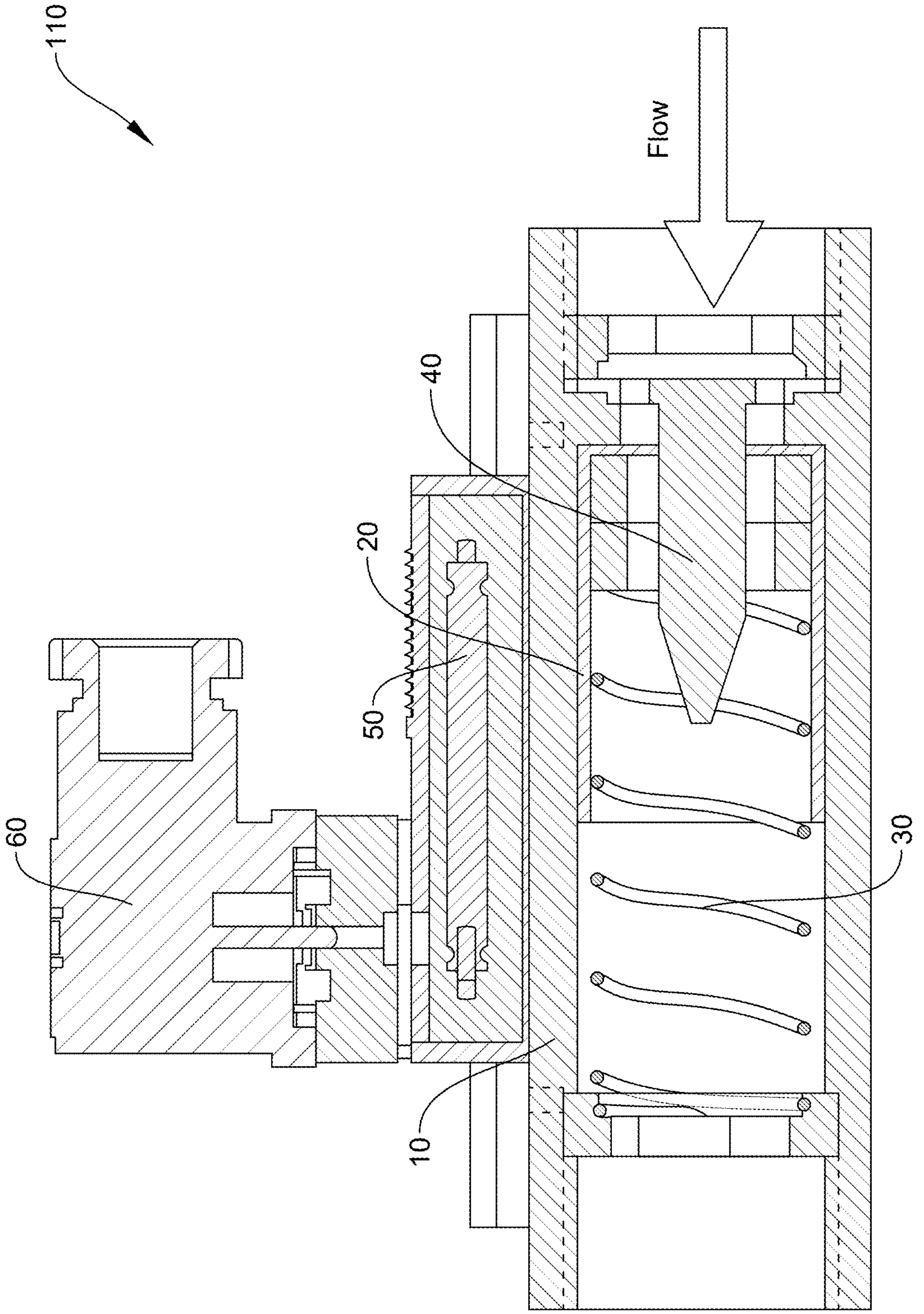
FIG. 3 is a side sectional view of a flow switch in accordance with the present invention.

FIG. 3 illustrates an exemplary flow switch 110 in accordance with the present invention. Similar items may be numbered similarly but increased by 10 (e.g., 2 to 20, 10 to 110, etc.) As a flow of fluid travels through or otherwise contacts the flow switch 10, the flow may travel through or contact an orifice body 20 of a base body 10. The fluid may be any type or kind of fluid (e.g., oil, water, air, etc.). The orifice body 20 may be moved against a spring 30 by the flow. The spring 30 may be biased against the intended direction of the flow. Where the volumetric flow rate encountered is sufficient, the orifice body 20 is displaced sufficiently to cause a switch 50 to be closed. In exemplary embodiments, a magnet is connected to, or forms part of, the orifice body 20 such that sufficient movement of the orifice body 20 resulting in closing or opening of the switch 50, which may comprise a reed which may optionally be biased in one position (e.g., opened or closed). Electrical signals reporting the status of the switch 50 (e.g., opened or closed) may be provided by way of electrical wires and/or transducers at an electronics subassembly 60. Other known techniques for switching and/or otherwise providing signaling may be utilized.

Figure 4B:
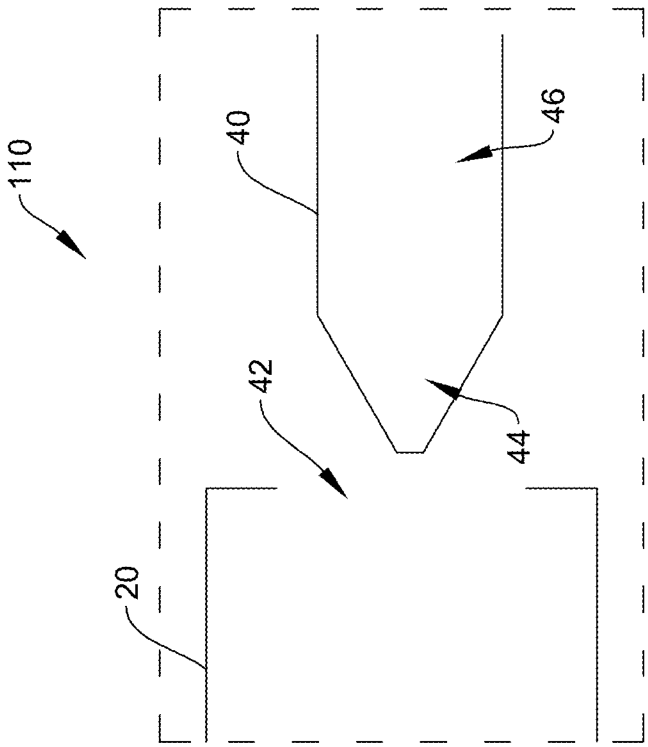
FIG. 4B is a detailed side sectional view of the flow switch of FIG. 3 with the projection in an exemplary second position.
Figure 4A:
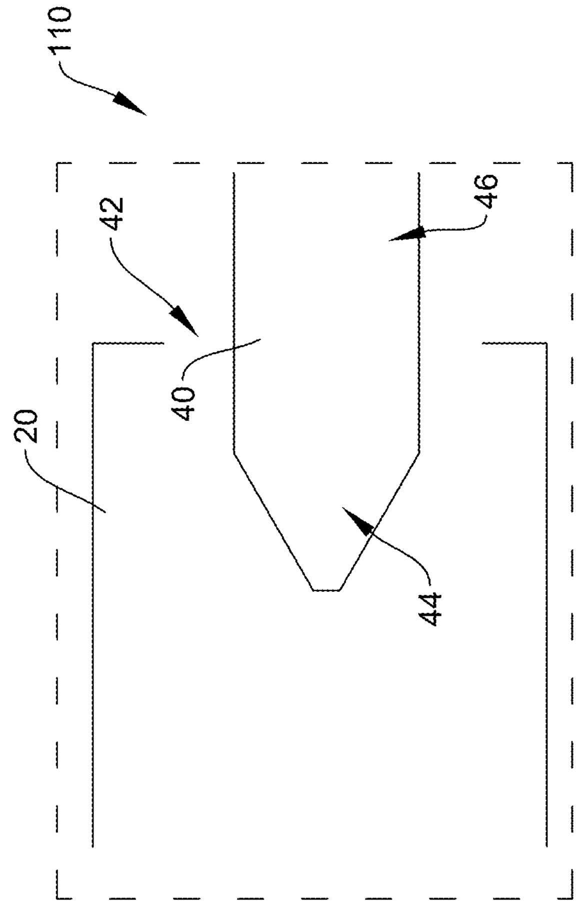
FIG. 4A is a detailed side sectional view of the flow switch of FIG. 3 with a projection in an exemplary first position.

The flow switch 110 may be configured to vary the size of an opening 42 to the orifice body 20, such as with volumetric flow rate. A projection 40 may be provided which is preferably fixed relative to the base body 10, thereby rendering the orifice body 20 moveable relative to the projection 40. The projection 40 may comprise a rod. During normal operation of the flow switch 110, the orifice body 20 may be moved. In this way, the orifice body 20, and specifically the opening 42, may be advanced or retracted relative to the projection 40, such as to vary a size of the opening 42. For example, without limitation, the orifice body 20 may be advanced over the projection 40 to reduce the size of the opening 42, such as illustrated with particular regard to FIG. 4A. This may occur at relatively low volumetric flow rates whereby the spring 30 advances the orifice body 20 forward by way of the spring's 30 bias. As another example, without limitation, the office body 20 may be retracted relative to the projection 40 to enlarge the size of the opening 42 to the orifice body 20, such as illustrated with particular regard to FIG. 4B. This may occur at relatively high volumetric flow rates whereby the spring 30 is compressed by the orifice body 20 due to force(s) of the flow. The orifice body 20 may be sufficiently movable such that at least a portion of the projection 40 may extend within the orifice body 20 at relatively low volumetric flow rates and the projection 40 is spaced apparat from the orifice body 20 at relatively high volumetric flow rates.

Preferably, a distal end portion 44 of the projection 40 is tapered to provide variability in size of the opening 42 and/or avoid relatively abrupt changes in the opening 42 size, and associated oscillation. A body 46 of the projection 40 may comprise a substantially (e.g., within 10%) consistent cross section.

While the projection 40 may be provided in the form of a rod (with or without the tapered end 44), the size and/or shape of the projection 40 as illustrated is exemplary and not intended to be limiting. The size and/or shape of the orifice body 20 and/or opening 42 as illustrated thereof is exemplary and not intended to be limiting. The orifice body 20 may be generally shaped as a hollow cylinder, though other sizes and/or shapes may be utilized. The opening 42 may be generally circular in shape, though other sizes and/or shapes may be utilized. In such instances, the projection 40 may be shaped according to the opening 42 size and/or shape, for example without limitation. For example, without limitation, another size or shape projection 40 or other object may be used.

The projection 40 may be fixed relative to the orifice body 20. For example, the projection 40 may be fixed to the base body 10 (directly or indirectly). Regardless, the orifice body 20 may be movable relative to the projection 40. In this fashion, the size of the opening 42 may be naturally increased under relatively high volumetric flow rates, such as by deflection of the orifice body 20 away from to the projection 40, and an eventual spaced apart arrangement with sufficiently high volumetric flow rates (see e.g., FIG. 4B). Additionally, the size of the opening 42 may be naturally decreased under relatively low volumetric flow rates, such as by movement of the orifice body 20 over the projection 40 (see e.g., FIG. 4B).

The position of the projection 40 relative to the opening 42 is exemplary and not intended to be limiting. Various positions of the projection 40 relative to the opening 42 may be utilized, including positions where the projection 40 remains at least partially extending through the opening 42, positions where the projection 40 is located entirely outside of the orifice body 20, positions where a portion of the projection 40 is located within the orifice body 20, positions where all or substantially all (e.g., >90%) of the projection 40 is located within the orifice body 20, combinations thereof, or the like. The spring 30 strength, orifice body 20 size and/or relative position, projection 40 size and/or relative position, combinations thereof, or the like may be varied accordingly.

Figure 5:
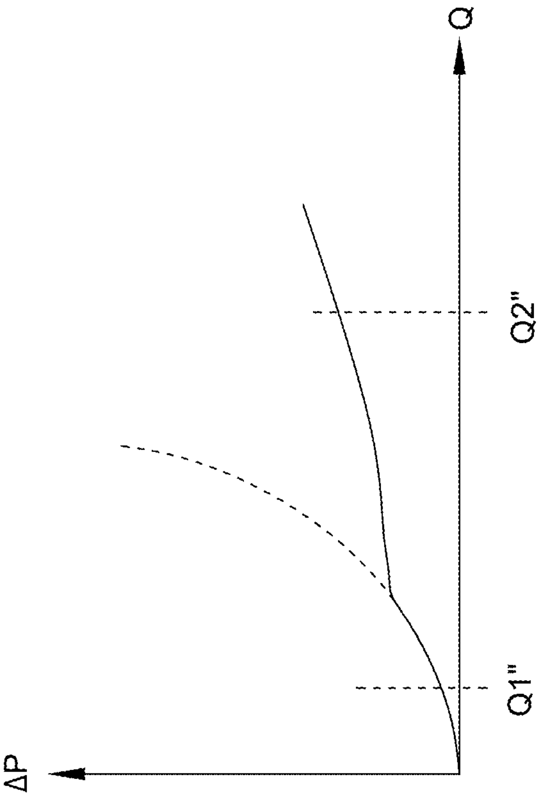
FIG. 5 is an idealized graphical representation of exemplary pressure drop vs flow rate chart for exemplary operations of the flow switch of FIG. 3.

FIG. 5 illustrates an exemplary pressure drop and flow rate relationship for the flow switch 110. As demonstrated, the dot-dashed line represents the relationship for the existing flow switch 10 compared to the solid line for the flow switch 110 with variable size opening 42. As shown, the flow switch 110 may have relatively reduced pressure drop at relatively higher volumetric flow rates. The disclosed flow switch 110 allows more precise switching, especially in the lower volumetric flow rate range. As shown, the flow switch 110 may thereby accommodate a relatively large operating range (e.g., Q1", Q2"). The pressure drop in the upper volumetric flow rate range for the flow switch 110 (e.g., illustrated in solid line), while still generally increasing, is much lower relative to the existing flow switch 10 due to the expanded orifice body 20 opening 42 size during such operations.

Figure 6:
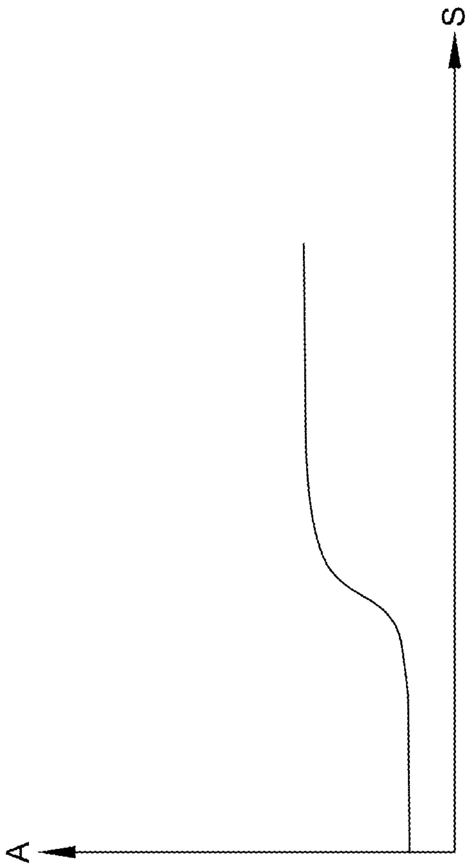
FIG. 6 is an idealized graphical representation of exemplary orifice opening vs body position for the flow switch of FIG. 3 undertaking the exemplary operations of FIGS. 4A-4B.

The size of the opening 42 (A) is graphically charted in FIG. 6 against the orifice body 20 position (S).

The graphs shown and/or described herein are idealized and/or exemplary to provide a generalized understanding, and thus are not intended to be limiting.

The disclosed solution may be used with other types and kinds of flow switches 110. Furthermore, other size or shape objects (e.g., projection 40) may be used.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectively components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A flow switch comprising:

a base body;

an orifice body which is moveable relative to the base body and includes an opening;

a spring connected to the orifice body; and a projection fixed relative to the orifice body, wherein the projection extends, at least in part, through the opening in the orifice body when the office body is in a first position, and the projection is located entirely outside of the orifice body when the orifice body is in a second position, thereby varying a size of the opening with the relative movement of the orifice body.

2. The flow switch of claim 1 wherein:

the spring biases the orifice body such that the orifice body is configured to be located in the first position at a first volumetric flow rate and the orifice body is configured to be located in in the second position at a second volumetric flow rate, where the second volumetric flow rate is greater than the first volumetric flow rate.

3. The flow switch of claim 2 wherein:

the projection comprises a rod.

4. The flow switch of claim 3 wherein:

the rod comprises a tapered end.

5. The flow switch of claim 4 wherein:

a body the rod comprises a circular cross section; and the tapered end is generally conical in shape.

6. The flow switch of claim 3 wherein:

the spring is directly connected to the orifice body; and the projection is fixed to the base body.

7. The flow switch of claim 1 further comprising:

a switch configured to be operated when the orifice body is moved; and an electronics subassembly in electronic connection with the switch.

8. A flow switch comprising:

a base body configured to accommodate a flow of a fluid;

an orifice body which is moveable relative to the base body, said orifice body comprising an opening;

a spring connected to the orifice body and biased against an intended direction of the flow of the fluid through the base body; and a projection fixed relative to the orifice body, wherein the spring is configured such that, at a first volumetric flow rate, at least a distal end of the projection protrudes through the opening and into the orifice body, and at a second volumetric flow rate which is higher than the first volumetric flow rate, the projection is located entirely outside of the orifice body.

9. The flow switch of claim 8 wherein:

the orifice body is shaped as a hollow cylinder;

the opening is circular in shape; and the projection is generally cylindrical in shape.

10. The flow switch of claim 9 wherein:

a distal portion of the body is tapered in a generally conical shape.

11. The flow switch of claim 8 wherein:

the projection comprises a rod which is fixed to the base body.

12. The flow switch of claim 8 further comprising:

a switch configured to be operated when the orifice body is moved; and an electronics subassembly in electronic connection with the switch.

13. The flow switch of claim 8 wherein:

the spring is directly connected to the orifice body and biases the orifice body towards the projection.

14. A method for operating a flow switch, said method comprising:

providing the flow switch along a flow of a fluid, said flow switch comprising:

a base body;

an orifice body which is moveable relative to the base body; and a spring connected to the orifice body;

wherein the orifice body comprises an opening that is variable in size with movement of the orifice body;

providing the flow of the fluid at a first volumetric flow rate such that the opening has a first size; and providing the flow of the fluid at a second volumetric flow rate which is higher than the first volumetric flow rate such that the opening has to a second size which is larger than the first size.

15. The method of claim 14 wherein:

the flow switch comprises a projection fixed relative to the orifice body; and the flow switch is configured such that the orifice body is configured to extend over a body portion of the projection at the first volumetric flow rate and be spaced apart from the projection at the second volumetric flow rate.

16. The method of claim 15 wherein:
the projection comprises a rod.

17. The method of claim 16 wherein:
the rod comprises a tapered end.

18. The method of claim 17 wherein:
the projection is fixed to the base body.

19. The method of claim 14 further comprising:
receiving signals from the flow switch representing status of the flow switch while the flow of the fluid is provided, wherein the flow switch comprises:
a switch configured to be operated when the orifice body is moved; and
an electronics subassembly in electronic connection with the switch.

* * * * *